United States Patent [19]

Wilson

[11] Patent Number: 4,608,056
[45] Date of Patent: Aug. 26, 1986

[54] DYE COMPOSITION AND METHOD OF USE THEREOF FOR COLORING THERMOPLASTIC MATERIALS

[76] Inventor: Robert B. Wilson, P.O. Box 6786, Greenville, S.C. 29606

[21] Appl. No.: 702,316

[22] Filed: Feb. 15, 1985

Related U.S. Application Data

[63] Continuation-in-part of Ser. No. 584,144, Feb. 27, 1984, abandoned.

[51] Int. Cl.$^4$ ............................................. D06P 5/00
[52] U.S. Cl. ........................................ 8/506; 8/508; 8/510; 8/512; 8/515; 8/516; 8/580; 8/583
[58] Field of Search ................... 8/583, 580, 584, 506

[56] References Cited

U.S. PATENT DOCUMENTS

| | | | |
|---|---|---|---|
| 4,293,305 | 10/1981 | Wilson | 8/115.6 |
| 4,394,126 | 7/1983 | Wilson | 8/115.6 |
| 4,426,297 | 1/1984 | Wilson | 252/8.6 |

*Primary Examiner*—A. Lionel Clingman
*Attorney, Agent, or Firm*—Bailey & Hardaway

[57] ABSTRACT

A waterless dye composition for apparel and other thermoplastic articles comprises an aromatic polyester of the formula $C_6H_{z'}$—$(COOR_1)_z$, wherein z is 3, 4, 5, or 6; z' is 6 - z; and $R_1$ is higher alkyl; and/or a cycloaliphatic diester of the formula

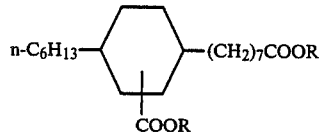

wherein R is substituted or unsubstituted straight or branched chain alkyl of 4–20 carbon atoms, polyoxyalkylene of the formula $HO(C_xH_yO)_nC_xH_y$— or phosphated polyoxyalkylene of the formula

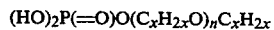

or a salt thereof, wherein $(C_xH_{2x}O)_n$ is $(CH_2CH_2O)_n$, $(C_3H_6O)_n$ or $(CH_2CH_2O)_p$—$(C_3H_6O)_q$, n is 2-22, and the sum of p+q is n; and an organic colorant.

A process for coloring apparel or other articles, fabricated from polyester, polyamide, polyurethane, acrylic, halogenated polyolefin or epoxy plastic, comprises exposing an article to the foregoing compositions, maintained at a temperature between 100° C. and the temperature at which the plastic is degraded, for a time adequate to achieve the desired degree of coloration.

The compositions may further be diluted with water and used for textile finishing processes or as dyeing assistants in aqueous baths.

42 Claims, No Drawings

DYE COMPOSITION AND METHOD OF USE THEREOF FOR COLORING THERMOPLASTIC MATERIALS

REFERENCE TO RELATED APPLICATION

This application is a continuation-in-part of Wilson Ser. No. 06/584,144, filed Feb. 27, 1984, abandoned.

TECHNICAL FIELD

This invention relates to waterless compositions, particularly adapted for immersion coloring of plastic articles, whether intended for apparel or general utility applications. The invention further relates to the use of the compositions as additives for water-based systems, useful in dyeing, spin finishing, or lubricating textile fibers and fabrics.

BACKGROUND ART

A continuous process for waterless dyeing of textile and plastic materials has been proposed by Hermes in U.S. Pat. Nos. 4,047,889 and 4,055,971. The vehicle disclosed is a high boiling glycol or glycol ether.

The use of ethoxylated materials for coloring of objects has been disclosed by Lenz et al. (U.S. Pat. No. 3,362,779) and Kressner et al. (U.S. Pat. No. 4,332,587).

Hinton, Jr. et al., in U.S. Pat. No. 3,824,125, have proposed the use of higher trialkyl trimellitates in laundry compositions to improve soil release properties of synthetic fibers, such as polyesters.

Compositions containing esterified derivatives of a hydrogenated Diels-Alder adduct of linoleic acid and acrylic acid, intended for use in various textile-treating compositions, have been disclosed by Wilson, in U.S. Pat. Nos. 4,293,305 and 4,394,126, incorporated herein by reference.

Although a variety of solvent systems have been suggested for dyeing of articles in waterless systems, none presently available provides rapid, failure-free dyeings, which are done without producing obnoxious effluents or otherwise being unacceptable from a commercial viewpoint.

It is an object of this invention to provide a composition for waterless immersion coloring of plastic articles, produced by the apparel and other industries. Such articles include, but are not limited to buttons, zippers, garments, carpeting, ribbons, draperies, shoe strings, sewing thread, lace, socks, plastic tubing and pipe, plastic coated wire, ropes, polyester and polyamide films, toys, and housings for pencils, pens, kitchen utensils and telephones.

It is a further object of this invention to provide a method for rapid waterless coloring of such articles.

DISCLOSURE OF THE INVENTION

In one aspect, this invention relates to a vehicle for waterless dip dyeing of thermoplastic articles, comprising an aromatic polyester of the formula $C_6H_{z'}$—(COOR$_1$)$_z$, wherein z is 3, 4, 5 or 6; z' is 6-z; and R$_1$ is substituted or unsubstituted higher alkyl or an alkylphenol ether of an alkoxyalkanol and/or a diester of a hydrogenated Diels-Alder adduct of linoleic and acrylic acids. When used as a dye bath for the coloring of thermoplastic articles, the vehicle will also contain sufficient amounts of an organic colorant to permit coloring of the thermoplastic articles being dyed.

In another aspect, this invention relates to a process for waterless coloring of thermoplastic articles, fabricated from a plastic composition, comprising exposing an article to the foregoing compositions, maintained at a temperature between 100° C. and the temperature at which the plastic degrades, for a time adequate to achieve the desired degree of coloration.

This invention further relates to compositions, containing one of the foregoing aromatic polyesters and one or more emulsifiers, for use in aqueous media for spin finishing, lubricating, or dyeing textile products, made from synthetic polymers.

"Aromatic polyester," as used in the specification and claims, means an ester formed by reaction between a polybasic aromatic acid of the benzene series and a higher alkanol, so as to accomplish complete esterification of all carboxyl functions therein. "Higher alkanol" means a substituted or unsubstituted alkanol of at least six carbon atoms, for example, hexanol, octanol, 2-ethylhexanol, isodecanol, decanol, hexadecanol, octadecanol, docosanol, oleyl alcohol, linoleyl alcohol or the like.

Also included among "higher alkanols" for the purposes of this invention are alkylphenol ethers of alkoxyalkanols, having the formula

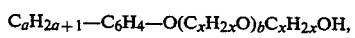
$$C_aH_{2a+1}—C_6H_4—O(C_xH_{2x}O)_bC_xH_{2x}OH,$$

wherein a is 1–12; b is 1–24 and x is 2 or 3, optionally including blocks of ethyleneoxy and propyleneoxy units.

The esters can be made by reaction between, for example, trimellitic acid, and the selected alkanol, conveniently in a fashion so as to remove or entrain by-product water. Alternatively, the aromatic polyesters can be prepared by transesterification between a lower ester, e.g. trimethyl trimellitate and the higher alkanol. In such a reaction, the lower boiling alcohol will normally be removed from the reaction site by distillation.

Contemplated among aromatic polyesters are esters of benzene tetra-, penta- and hexacarboxylic acids, wherein R is as above. Accordingly, esters of prehnitic, mellophanic, pyromellitic, trimesic, trimellitic and hemimellitic acids are included, as well as esters of benzenepentacarboxylic acid and mellitic acid.

Although triesters of any of the benzenetricarboxylic acids can be used, it is preferred to use triesters of 1,2,4-benzentricarboxylic acid, also known as trimellitic acid. Preferred esters are tris(2-ethylhexyl)trimellitate, trisisodecyl trimellitate, trisisooctyl trimellitate, tridecyl trimellitate, and trihexadecyl trimellitate. It will be understood that mixed esters, such as hexyl, octyl, decyl trimellitate can also be used. Most preferred is tris(2-ethylhexyl)trimellitate (CAS No. 3319-31-1), also known as trioctyl trimellitate, which can be purchased from Eastman Chemical Products, Inc., Kingsport, Tenn., as Kodaflex ® TOTM.

The foregoing polyesters are used alone or in combination with a cycloaliphatic diester of the formula

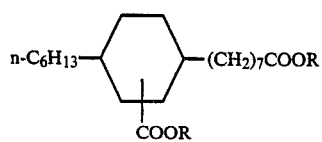

wherein R is substituted or unsubstituted straight or branched chain alkyl of 4–20 carbon atoms, polyoxyalkylene of the formula HO($C_xH_yO$)$_n C_x H_y$— or phosphated polyoxyalkylene of the formula $$(HO)_2P(=O)O(C_xH_{2x}O)_nC_xH_{2x}$$

or a salt thereof, wherein ($C_xH_{2x}O$)$_n$ is ($CH_2CH_2O$)$_n$, ($C_3H_6O$)$_n$ or ($CH_2CH_2O$)$_p$—($C_3H_6O$)$_q$, n is 2–22 and the sum of p+q is n. Other cycloaliphatic diester compounds which can be used are those wherein R is ArCOO($CH_2CH_2O$)$_n CH_2CH_2$—, ArCOO($C_3H_6O$)$_n C_3H_6$—, ArCOO($C_2H_4O$)$_p$($C_3H_6O$)$_q C_3H_6$— or ArCOO($C_3H_6O$)$_p$—($C_2H_4O$)$_q C_2H_4$—, wherein n, p and q are as above and Ar is substituted or unsubstituted mono- or bicyclic aryl of up to 15 carbon atoms. It is preferred that compositions of this invention containing an additional ester, contain at least 5% by weight of one or more of these cycloaliphatic diesters. It is also preferred that the compositions contain a maximum of 95% by weight of the cycloaliphatic diester. However, in view of the superior thermal stability of aromatic polyesters, vehicles containing these as the sole non-dye component are also preferred.

The dibasic cycloaliphatic acid employed in making the compositions of this invention is a Diels-Alder adduct of acrylic acid and linoleic acid and can be prepared as described by Ward in U.S. Pat. No. 3,753,968. The diacid has the formula

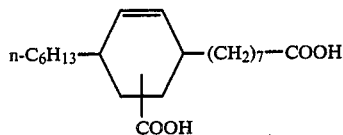

and therefore is a mixture of (5 and 6)-carboxy-4-hexyl-2-cyclohexene-1-octanoic acids. The diacid is available commercially from Westvaco, designated as "Diacid 1550".

Preparation of adducts from conjugated octadecadienoic acid and unsaturated acids and/or their hydrogenation has also been described by Teeter et al, *J. Org. Chem.*, vol. 22 (1957) at 512–514, Ward in U.S. Pat. No. 3,899,476 and Ward et al in U.S. Pat. No. 3,981,682.

The preparation of esters from the $C_{21}$ diacid adduct was reported by Ward et al, *J. Amer. Oil Chemists' Soc.*, vol. 57 (1957) at 219–224. Ethoxyated esters containing 4–119 ethylene oxide units are said to be effective lime soap dispersants. The alkyl esters are reported as being useful in lubricant applications, including use as textile lubricant and plasticizers for PVC.

The diacid can be esterified with alcohols using, for example, acidic catalysts such as p-toluenesulfonic acid, methanesulfonic acid or sulfuric acid. During the esterification, the reaction mixture is preferably also treated with a decolorizing agent, e.g., carbon or clay.

The diacid is reduced following esterification to a saturated compound. A nickel catalyst such as Raney Nickel, nickel on kieselguhr or nickel on alumina can be used. The required amount varies up to 5–10% by weight of the ester.

Hydrogenation is carried out after esterification to prevent nickel from complexing with the free acid. Other catalysts, e.g., platinum or rhodium, avoid this problem, but are prohibitive in cost. The catalyst can be removed by filtration through a plate and frame filter press. The product is the resulting filtrate.

Polyoxyalkylene diesters are prepared by reaction of the diacid, in the presence of an alkaline catalyst, with ethylene or propylene oxide. Reaction will occur at both acid sites. Addition of ethylene oxide is allowed to continue until the product becomes at least dispersible or, preferably, soluble in water. This will correspond to addition of a total of 5–25 ethylene oxide units. The product obtained using ethylene oxide has a structure before hydrogenation represented by the formula:

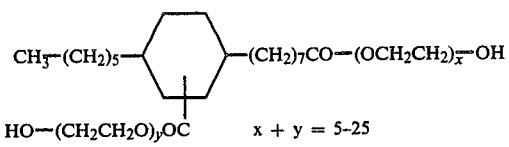

The phosphorylated product is readily obtained by reaction with phosphorus pentoxide. The saturated diester can be obtained by nickel-catalyzed hydrogenation.

In the case of the phosphorylated derivative, hydrogenation should precede phosphorylation. The phosphorylated derivatives can be converted to salts thereof by reaction with a metal hydroxide. Sodium and potassium salts are preferred.

Compounds in which R is ArCOO($CH_2CH_2O$)$_n CH_2CH_2$—, etc. are obtained by treating polyoxyalkylene intermediates with an aromatic acid, e.g., benzoic, toluic or mellitic acid, usually with an acidic catalyst. Hydrogenation of the double bond in the cycloaliphatic ring can be done before or after esterification with the aromatic acid.

Representative of substituted alkyl R which may be used in the products of this invention are butoxybutyl, 10-hydroxystearyl, 10-hydroxydecyl, 10-halostearyl, ω-alkanoyloxyalkyl or the like.

Preferred cycloaliphatic diesters for use in accordance with the principles of the invention are those wherein:

(a) R is straight or branched chain alkyl of 4–20 carbon atoms,
(b) R is 2-ethylhexyl, lauryl or stearyl,
(c) R is HO($CH_2CH_2O$)$_n CH_2CH_2$—,
(d) R is HO($C_3H_6O$)$_n C_3H_6$—,
(e) R is HO($C_2H_4O$)$_p$($C_3H_6O$)$_q C_3H_6$—,
(f) R is (HO)$_2$P=O(OCH$_2$CH$_2$)$_n$OCH$_2$CH$_2$— or a salt thereof,
(g) R is $C_6H_5CO(OC_2H_4)_n OC_2H_4$—,
(h) R is $CH_3C_6H_4CO(OC_2H_4)_n OC_2H_4$—
(i) R is $C_6H_5CO(OC_3H_6)_n OC_3H_6$—, and
(j) R is $CH_3C_6H_4CO(OC_3H_6)_n OC_3H_6$—.

The types of plastic materials which can be colored using the compositions and method of this invention include, but are not limited to, polyesters, polyamides, polyurethanes, acrylics, halogenated polyolefins and epoxy plastics. However, textile- and apparel-related articles are commonly made from polyesters, polyamides, polyurethanes and acrylics, which substrates are preferred for the practice of this invention. Pipe and tubing are commonly made from chlorinated polyethylene (CPE) or post-chlorinated PVC (PCPVC).

Polyester articles include those made from poly(alkylene terephthalates), such as poly(ethylene terephthalate), or polyesters made from cyclohexanedimethanol. Typical of polyester articles are presewn garments, including slacks, jeans, dresses, shirts, scarves and the like. Also included within the scope of polyester articles are buttons, draperies, laces, seatbelts, ribbons, zippers and other notions, as well as chips of polyester resins, polyester coatings on wire or metal, polyester articles (including those made from styreneated polyesters), polyester films, toys, components of automobiles and airplanes and housings for pencils, pens or household articles.

Polyamides particularly contemplated as substrates in the practice of this invention include those known as nylons 6; 6,6 or 6,10. Articles which can be colored in accordance with the invention include the same types of articles as for polyesters, as well as lingerie and hoisery. It is common, for example, to employ polyamide teeth in zipper constructions. Polyamides are often used for carpeting and ropes.

Acrylic plastics, contemplated within the scope of this invention include straight acrylics, such as polyacrylonitrile, and modacrylics. The latter are copolymers of acrylonitrile or methacrylonitrile, generally with vinyl chloride or vinylidene chloride. Articles made from acrylics include clothing, carpeting and notions.

Also included among acrylics are high impact resins, whether comprising blends or graft copolymers. These are commonly identified as ABS resins. Articles made therefrom include chips, coatings for wire and metal, telephone housings, toys, impact-resistant moldings for automobiles and airplanes, and housings for pencils, pens and kitchen utensils.

Polyurethanes include a myriad of compositions, made by reaction, for example, between glycols and organic di- or polyisocyanates. Among the glycols, used to make polyurethanes, are simple glycols, such as the alkylene glycols, and polymeric glycols, including polyether and polyester glycols. Articles containing polyurethane, include rain wear, artificial leather, toys, and moldings and extrusions for automobiles and airplanes. Any of these articles can be colored by the teachings of the instant invention.

In some instances, the foregoing types of plastics can be blended with natural or synthetic cellulosic materials and colored according to this invention.

"Organic colorant," as used in the specification and claims, includes both dyes and pigments of any structure. Normally, the dyes or pigments which are employed need not be soluble in water. Therefore, such dyes and pigments will not usually contain water-solubilizing functions, such as a plurality of sulfonic acid groups. The dyes/pigments used in the practice of this invention generally will be chosen from among water-insoluble dyes, which may also be known as disperse dyes. Included within this class of dyes, which can be used on fibers such as cellulose acetate, polyamides or polyesters, from any kind of dyeing medium are colors of azo, azomethine, nitroarene and anthraquinone structures. It will be understood that the dyes useful in the practice of the present invention are not limited to these classes of compounds.

The dyes or pigments used in the practice of this invention may be identified by their chemical names, for example:

3-nitro-$N^4$-phenylsulfanilanide, a yellow dye; p-[p-(phenylazo)phenylazo]-phenol, a red-yellow dye; ethyl 4-hydroxy-1-anthraquinocarbamate (an orange dye); 1-amino-4-hydroxyanthraquinone, a red dye; 1-amino-2-bromo-4-hydroxyanthraquinone, a red-blue dye or 4,5-diaminochrysazin, a blue dye.

The dyes alternatively may be identified in accordance with standard chemical handbooks, such as "The Color Index," third edition, The Society of Dyes and Color and the American Association of Textile Chemists and Colorists (1971). This sort of handbook correlates dye structure with trade names. Typical of colorants identified in accordance with this handbook, which can be used in the practice of this invention, are Solvent Orange 20; Acid Blue 83 (C.I. 42660), Acid Blue 59 (C.I. 50315), Direct Blue 86 (C.I. 74180); Direct Red 81 (C.I. 28160) and Acid Yellow 36 (C.I. 13065).

Cationic dyestuffs can also be used in the practice of this invention, for example Rhodamine 6G, Rhodamine B, Rhoduline Blue 6G and Methylene Blue BB.

Similarly, metallized azo dyestuffs can be employed in the practice of this invention. Representative metallized azo dyes which can be employed are Co, Ni, Cu or Cr complexes of coupling products of 2-amino-4-nitrophenol and resorcinol; 2-amino-4-chloro-5-nitrophenol and acetoacetanilide; dianisidine and 3-hydroxy-2-naphthanilide; 2-amino-4-chloro-5-nitrophenol and 2-aminonaphthalene or the like.

It will further be understood that other textile-treating agents, such as optical brighteners, e.g. styrylnaphthoxazole compounds, can be applied, along with dyes or pigments.

The dyes/pigments can be used in any form, that is, as presscake or as dried pressed dye. The addition of dispersing agents is optional. Alternatively, the dyes or pigments can be added to the dye bath in a solvent/dispersing medium compatible with the dye bath. It is convenient and preferred, in the practice of the invention, to use solid disperse dyes free of additives.

It has been found that waterless dye baths containing at least 5% by weight of an aromatic polyester can be decolorized using activated carbon, whereas baths of prior art compositions, containing no aromatic polyester are not readily decolorized in this fashion. Most preferably, these compositions contain at least 5% by weight of trialkyl trimellitate, wherein alkyl is of 6–22 carbon atoms.

Addition of triphenyl phosphite to the dye baths has been found to reduce discoloration of the dye bath. Accordingly, compositions containing 0.1–2.0% by weight of triphenyl phosphite are preferred. The baths can contain, in addition to or instead of triphenyl phosphite, 0.1–2.0% by weight of 2,2'-oxamido bis[ethyl 3-(3,5-di-tert.-butyl-4-hydroxyphenyl)propionate].

Optional emulsifiers or dyeing assistant agents, used in the compositions of this invention, include, but are not limited to, alkoxylated alkylphenols and their esters, alkoxylated castor oil compounds, alkoxylated hydrogenated castor oil compounds, alkoxylated primary alkanols, salts of phosphated alkoxylated primary alkanols or alkylphenols, ethoxylated sorbitan esters and mixtures thereof. These optional emulsifiers or dyeing assistant agents can be used in the waterless dyebath compositions or in lubricant, spin finishing or dyeing bath additives, for aqueous dye baths, in accordance with Wilson, U.S. Pat. Nos. 4,293,305 and 4,394,126.

The amount of optional emulsifier or dyeing assistant agent, employed in the compositions of this invention, is at least about 0.5% by weight of the composition and can be as high as 60–80% by weight. Waterless dye bath compositions will preferably contain 5–10% by weight of one or more optional emulsifiers.

Ethoxylated alkanols, such as optional emulsifiers, will be of alkanols of 8–24 carbon atoms, ethoxylated so as to contain 2–30 ethyleneoxy units. Typical ethoxylated alkanols which can be used are lauryl alcohol 3.5 ethoxylate (POE 3.5) or POE (18) tridecyl alcohol.

Preferred optional dyeing assistant agents are alkoxylated alkylphenols and their esters. These are compounds of the formula

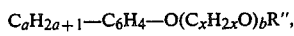

$$C_aH_{2a+1}-C_6H_4-O(C_xH_{2x}O)_bR'',$$

wherein a is 1-12; b is 1-24; R" is H, aroyl of mono- or bicyclic aromatic acids of up to 15 carbon atoms or substituted or unsubstituted alkanoyl of 8-30 carbon atoms. Accordingly, exemplary dyeing assistant agents include ethoxylated and propoxylated alkyl phenols and corresponding esters, such as the laurate, myristate, palmitate, coconate, oleate, stearate, isostearic, benzoate and toluate esters. Preferred alkylphenols are nonylphenol, octylphenol, and dodecylphenol.

It will be understood that the alkylphenols and the acids used to esterify the alkoxylated alkylphenols can include mixtures.

Most preferably, the alkoxylated alkylphenols will be ethoxylated derivatives, having 5-10 ethylene oxide units.

Preferred emulsifiers or optional dyeing assistant agents will be those wherein:
(a) R" is alkanoyl of 12-18 carbon atoms, including mixtures thereof;
(b) R" is n-$C_{17}H_{33}CO$;
(c) R" is n-$C_{17}H_{35}CO$;
(d) R" is iso-$C_{17}H_{35}CO$;
(e) R" is benzoyl;
(f) R" is n-$C_{11}H_{23}CO$;
(g) R" is H;
(h) a is 5-10, including each of (a)-(g);
(i) b is 6-15, including each of (a)-(h);
(j) b is 8-11, including mixtures thereof and including each of (a)-(h);
(k) a is 9, b is 8-10 and R" is n-$C_{11}H_{23}CO$;
(l) a is 9, b is 6-10 and R" is H and
(m) x is 2, including each of (a)-(l).

Alkoxylated castor oil used as an optional additive in the compositions of this invention will contain 15-100 oxyalkylene units, preferably 40-85 oxethylene units. The hydrogenated cator oil derivatives will contain 5-200 oxyalkylene units, preferably 20-30 oxyethylene units. These types of materials can be purchased from ICI America and Whitestone Chemical Co.

It has been found, in accordance with this invention that articles can be dyed or colored very rapidly and very homogeneously. Normally, immersion in the dye bath for as little as 30 seconds at 160° C. will give significant coloration. However, for even faster results, the dyeings can be done at 180°-200° C. or higher. Employing the compositions of this invention at 200° C. or more does not result in smoking or pollution of the processing plant, which is a problem when ethylene glycol or diethylene glycol are the dyeing solvents. In practice, it is feasible to use a temperature, up to that at which the plastic being dyed, will degrade. However, temperatures between 120°-235° C., most preferably 140°-235° C., will be preferred.

Although it is preferred to dye the articles being treated by immersion in a bath of the dye composition, the dyes can also be applied by spraying. Then, the sprayed articles should be heated in a bath to at least 140° C. to complete uptake of the dye into the article.

Whether the article is dyed by immersion or otherwise, the dyed article is normally cleaned with a solvent to remove excess dye. Preferably, the solvents used for cleaning are chlorinated or fluorinated hydrocarbons. However, highly chlorinated solvents, such as perchloroethylene and trichlorethylene are preferred for cleaning by immersion in a liquid bath. Fluorochlorocarbons, such as dichlorodifluoromethane, chlorotrifluoromethane, which are gases at ambient temperatures or slightly above, can be used for vapor-phase cleaning of the dyed articles. Normally, means will be used to recover and recycle the cleaning solvent, rather than discharging it to the atmosphere.

A further advantage of the process of the invention is that it is essentially self-contained and effluent free, that is, little or no material is lost or discharged to the atmosphere.

In the apparatus of this invention, the major components include a dip tank, a dye recovery unit, a solvent cleaning tank, a solvent recovery still and a drier. The dip tank will be provided with heating means and stirring means, so as to permit circulation of the dyeing solution within the dip tank and to a dye recovery unit external thereto.

The dye recovery unit normally includes filtration means for removal of solid debris from used dye solutions and distilling and condensing means for recovery of the solvent. The purified dye solution can be recycled to the dip tank, with addition of dye or other additives to provide the desired composition in the dip tank, or can be stored for later use.

It is preferred, in coloring many types of textile-related articles, including jeans, shorts, lingerie, carpeting, hoisery, zippers and lace, as exemplary, to provide squeeze roller means, essentially functioning as wringers, to remove excess dye solution from treated articles. The dye solution removed at this point can be cycled to the external recovery unit or can be returned directly to the dip tank.

When the dye bath contains at least 5% by weight of aromatic polyester and is free of other optional dyeing assistant agents, it is preferred to recover clean dye vehicle by treatment with activated carbon. This treatment permits reuse of the dyeing vehicle with a plurality of different organic colorants and avoids the need for recovering the dyeing vehicle by distillation.

Articles leaving the squeeze roll station are passed into the solvent cleaning tank to complete removal of any excess of unadherent dye matter. It is preferred to use a plurality of solvent cleaning tanks. It is also preferred to circulate solvent from the tank through an external solvent recovery unit, provided with filters to remove solid materials and distilling and condensing means for purifying solvent, and to return purified solvent to the system. Dye recovered on the filter or as residue from the distillation can be returned to the system for recycle. When a plurality of solvent cleaning tanks are employed, it is preferred to flow solvent countercurrently to the direction in which the articles being treated, are moved.

The final component of the apparatus is the drying means, such as a hot air drier, from which articles leaving the system can be inspected and packaged. Solvent vapors from the hot air drier can be condensed and returned to the system.

Textile-processing compositions, other than waterless dye bath media, used in the practice of this invention, can be applied at any of several stages of fiber processing. The following are exemplary of application to polyester fiber.

A. Spin Finish Application

The spin finish is applied to the yarn from a 10–20% emulsion to give a finish level on the yarn of 0.25–10%. The treated yarn can be built into yarn packages which can be used in high speed texturizing machines.

Compositions used as spin finishes will preferably have the following compositional range:

| parts by weight | |
| --- | --- |
| 0–40 | cycloaliphatic diester |
| 20–60 | aromatic polyester |
| 10–50 | emulsifiers optional additives |

Most preferably, the compositions will contain 25–35 parts by weight of the cycloaliphatic diester and 25–35 parts by weight of aromatic polyester. However, acceptable spin finish compositions are obtained using aromatic polyester and emulsifiers and other additives as the sole components.

Spin finish compositions will preferably contain a cycloaliphatic diester in which R is alkyl of 4–20 carbon atoms, most preferably 12–20 carbon atoms. The aromatic polyester will preferably be as above.

Preferred optional dyeing assistant agents will be ethoxylated nonylphenol esters, particularly in combination with one or more of ethoxylated castor oil, ethoxylated hydrogenated castor oil and/or phosphated ethoxylated alkylphenol.

A most preferred spin finish composition will consist essentially of:

| parts by weight | |
| --- | --- |
| 25–35 | cycloaliphatic bis(2-ethylhexyl)ester |
| 25–35 | trioctyl trimellitate |
| 10–20 | ethoxylated nonylphenol laurate |
| 4–6 | ethoxylated castor oil |
| 8–12 | ethoxylated hydrogenated castor oil |
| 8–12 | ethoxylated nonylphenol phosphate, K salt |

The spin finish compositions can be diluted with water to form a stable emulsion or dispersion. The spin finish is preferably applied to produce a pick-up of 0.4–0.75% by weight.

A representative polyester treated to a 0.5–0.6% pick-up with the spin finish of this invention will have lower heat history characteristics than yarn treated with a conventional spin finish. Yarns thus treated can accordingly be texturized at lower temperatures than possibly previously and can be dyed in an aqueous bath at lower temperatures than previously used. In addition, the spin finish will not smoke or fume during texturizing at 200°–240° C.

It is recommended that, after the spin finishing compositions of this invention have been applied, no further lubricants be used, so as to prevent adulteration of the finishes. Maximum benefit will be obtained by exclusive use of the compositions of the invention through conversion of the treated yarn to piece goods and dyeing.

B. Knitting Applications

The composition is applied as a knitting lubricant and is left on the yarn during downstream yarn processing. That is, the lubricant need not be scoured off as are conventional lubricants. The capability of omitting a previously-required processing step is an important advantage in utilizing the teachings of this invention.

During weaving or knitting, high temperatures are reached due to friction, but the lubricants of this invention will remain functional and not gum up or build up on the equipment.

In dyeing in an aqueous dye bath, the lubricant does not break down during the dyeing cycle or smoke during drying and heat setting of the fiber. Elimination of hazy blue smoke during drying and heat setting is important because of increasingly stringent restrictions on air pollution.

The lubricant compositions of this invention will preferably be as follows:

| parts by weight | |
| --- | --- |
| 0–30 | cycloaliphatic diester |
| 30–90 | aromatic polyester |
| 10–60 | emulsifiers and optional additives |

Most preferably, the compositions will contain 15–25 parts by weight of cycloaliphatic diester, 35–45 parts by weight of aromatic triester and 15–25 parts by weight of optional dyeing assistant agents. Preferred ingredients are as above. As noted above, water-based compositions, containing no cycloaliphatic diester, are entirely acceptable.

Other materials in the lubricant composition can include an antioxidant, such as butylated hydroxytoluene, in an amount up to about 0.5% by weight; an alkanolamine, such as triethanolamine, in an amount up to about 5.0% by weight; and up to about 2.5% by weight of water.

A most preferred lubricant composition comprises:

| parts by weight | |
| --- | --- |
| 25–35 | cycloaliphatic bis(2-ethylhexyl)ester |
| 35–45 | trioctyl trimellitate |
| 15–25 | ethoxylated nonylphenol laurate |
| 5–15 | ethoxylated nonylphenol |
| 0.05–0.2 | butylated hydroxytoluene |
| 1–5 | triethanolamine |
| 1–2 | water |

For satisfactory performance, the take-up, expressed as minimum percent extractables, when the treated fiber or fabric is loaded into the dyeing machine, should be at least 0.075% by weight of cycloaliphatic diester and 0.075% by weight of aromatic polyester.

C. Application as Coning Oil

Coning oil is applied after texturing or while the yarn is being wound. For this use, the compositions will also contain a major amount, up to 70% by weight, of ethylene oxide-propylene oxide copolymers of 2000–5000 molecular weight. Typical materials, which are appropriate, are Ucon ® LB and HB (Union Carbide Co.) and the Pluronics ® (BASF) or Jeffox fluids (Texaco, Inc.).

Coning oils in accordance with the invention will include:

| parts by weight | |
| --- | --- |
| 0–10 | cycloaliphatic diester |
| 5–20 | aromatic polyester |
| 2–20 | emulsifiers and optional dyeing assistant agents |

| parts by weight | |
|---|---|
| 60-70 | ethylene oxide-propylene oxide copolymer |

Preferred compositions will contain cycloaliphatic diesters, wherein R is of 4-20 carbon atoms, most preferably 6-12 carbon atoms and a trimellitate ester. The optional dyeing assistant agent will preferably be an ester of an ethoxylated alkylphenol, most preferably nonylphenol. Other preferred additives will be ethoxylated alkanols, the corresponding phosphates and ethoxylated hydrogenated castor oil.

Coning oil compositions can also include up to about 0.5% by weight of an antioxidant, such as butylated hydroxytoluene, up to about 2.5% by weight of an alkanolamine and up to 2.5% by weight of water.

D. Dyeing

Dyeing assistant agents, for aqueous dye baths, will consist of:

| parts by weight | |
|---|---|
| 0-40 | cycloaliphatic diester |
| 20-90 | aromatic polyester |
| 10-30 | optional dyeing assistant agents |

The cycloaliphatic diesters utilized for this aspect of the invention will preferably be those in which R is alkyl of 4-20 carbon atoms, most preferably of 6-12 carbon atoms. Preferred aromatic polyesters are trimellitates, most preferably trioctyl trimellitate.

It has surprisingly been found that aqueous and non-aqueous dye baths containing aromatic polyester, with or without emulsifiers or other optional dyeing assistant additives, but no cycloaliphatic diester, have better high temperature stability than compositions containing both the aromatic polyester and the cycloaliphatic diester.

Preferred emulsifiers and optional additives will be esters of ethoxylated alkylphenols, most preferably ethoxylated nonylphenol. Preferred compositions will also contain at least one ethoxylated castor oil or ethoxylated hydrogenated castor oil or a phosphated derivative (K salt) of an ethoxylated cycloaliphatic diester (R is phosphated polyoxyethylene).

A most preferred dyeing assistant composition will contain:

| parts by weight | |
|---|---|
| 25-35 | cycloaliphatic bis(2-ethylhexyl)ester |
| 35-45 | trioctyl trimellitate |
| 10-20 | POE nonylphenol laurate |
| 4-6 | POE castor oil |
| 8-12 | POE hydrogenated castor oil |
| 8-12 | POE cycloaliphatic diester phosphate, K salt |

Another most preferred dyeing assistant composition will contain:

| parts by weight | |
|---|---|
| 40-60 | trioctyl trimellitate |
| 15-25 | POE nonylphenol laurate |
| 5-10 | POE castor oil |
| 10-15 | POE hydrogenated castor oil |
| 10-15 | POE cycloaliphatic diester phosphate, K salt |

The composition is applied to the dyebath at a level of about 0.25% by weight of the goods entering the acidic (pH=5±0.5) dyebath. The only additional ingredients in the bath are water and the colorant. This is unlike conventional processes, in which the dyeing assistant agent is added in amounts of 2-4%, by weight, along with auxiliary levelling agents.

Dyed yarns obtained using the compositions of this invention compare favorably with conventionally-dyed yarns with respect to properties such as lightfastness, crocking, shape depth and levelness.

BEST MODE FOR CARRYING OUT THE INVENTION

In a most preferred aspect, the compositions of this invention will contain 15-90% by weight of aromatic polyester and 0.05-2.0% by weight of triphenyl phosphite and the aromatic polyester will be a trialkyl trimellitate in which alkyl is of 6-20 carbon atoms, the cycloaliphatic diester will be one wherein R is of 6-20 carbon atoms and the organic colorant will be a disperse dye.

A most preferred process in accordance with this invention is one wherein the article being treated is exposed to the foregoing composition, maintained at a temperature of 140°-235° C. for a time adequate to achieve the desired degree of coloration.

Without further elaboration, it is believed that one skilled in the art can, using the preceding description, utilize the present invention to the fullest extent. The following specific embodiments are, therefore, to be construed as merely illustrative and not limitative of the remainder of the disclosure in any way whatsoever. In the following examples, the temperatures are set forth uncorrected in degrees Celsius. Unless otherwise indicated, all parts and percentages are by weight.

EXAMPLE 1

Preparation of Polyoxyethylene Nonylphenyl Laurate

To a three-necked flask fitted out with stirrer, condenser, receiver, thermometer, nitrogen purge and heating mantle were charged 750 g (1.1 moles) of polyoxyethylated nonylphenol (9.5 moles of oxyethylene, NP 9.5), 208 g (1 mole) of lauric acid and 2.4 g of p-toluenesulfonic acid. Air was purged from the flask with nitrogen and the mixture was heated to 160°-170° C. Water was removed continuously. The reaction was allowed to continue until an acid value below 10 mg/KOH was obtained for a sample of product. The product was cooled and filtered.

Other polyoxyethylene compounds are made in a similar fashion from:
(1) NP 9.5 and coconut fatty acid; 1:1 molar ratio
(2) NP 9.5 and oleic acid; 1:1 molar ratio
(3) NP 9.5 and stearic acid; 1:1 molar ratio
(4) NP 9.5 and benzoic acid; 1:1 molar ratio.

EXAMPLE 2

Preparation of Cycloaliphatic Diester (R is 2-ethylhexyl)

To a three-necked flask fitted with stirrer, thermometer, nitrogen purge, condenser, side-arm receiver and heating mantle were charged 352 g (1 mole) of Diacid 1550, 273 g (2.1 moles) of 2-ethylhexanol, 1.5 g of p-toluenesulfonic acid and 2 g of decolorizing carbon. Air was purged from the flask with nitrogen and the reaction mixture was stirred and heated to 160°–170° C. for 4–6 hours. Water formed during the reaction was collected in the side-arm receiver. The reaction was continued until the acid value was below 5 mg KOH/g. The catalyst and carbon were removed by filtration. The ester product and 25 grams of nickel on kieselguhr were charged to a stirred, heated pressure vessel. The mixture was heated to 160°–170° C. and pressurized to 400 psig with hydrogen. A sample was removed after 6–8 hours for determination of the iodine value. The reaction was continued until the iodine value was below 0.5 g of iodine/100 g of sample.

The product was cooled to 50° C. and the catalyst was removed by filtration.

Esters are prepared similarly from:
(1) Diacid 1550 and decyl alcohol, 1:2 molar ratio
(2) Diacid 1550 and tridecyl alcohol, 1:2 molar ratio
(3) Diacid 1550 and Neodol 25 (a mixture of 12–15 carbon alcohols), 1:2 molar ratio.

EXAMPLE 3

A. Preparation of Polyoxyethylene Unsaturated Cycloaliphatic Diester, R is HO(CH$_2$CH$_2$O)$_n$CH$_2$CH$_2$—)

To a stirred autoclave fitted with heating and cooling coils was charged 352 g (1 mole) of Diacid 1550. Catalyst (1.0 g of potassium hydroxide) was charged to the reactor. The temperature was raised to 110° C. and the reactor was vacuum stripped for 30–60 minutes to remove any residual water from previous washing of the reactor or from one or more of the charged reactants or catalyst. The reactor was purged with nitrogen to remove air, evacuated again and purged again with nitrogen. The contents of the reactor were stirred and heated to 140° C. and 100 g (2.3 moles) of ethylene oxide was added to the reactor. The pressure inside the reactor immediately built up to 30–50 psig. After 30–60 minutes' induction time, an exothermic polymerization reaction (to 150°–160° C.) began. The reaction was accompanied by a pressure drop to zero (0 psig) as the ethylene oxide was consumed. Ethylene oxide was added to the reactor to a total of 660 g (15 moles). The temperature was maintained at 150°–160° C. by cooling. Addition of ethylene oxide was stopped and the reaction was allowed to continue for 30 minutes more. The reactor was cooled to 90°–100° C. and purged twice with nitrogen.

A sample of the product had a hydroxyl value of 110 mg of KOH/g (15 moles of ethylene oxide added to the diacid). The diester was acidified with acetic acid to neutralize the potassium hydroxide catalyst and treated with 3 g of hydrogen peroxide to bleach and lighten the color of the product. The reactor was cooled to 30° C. prior to removing the product, which was filtered through filter paper, using a porcelain filter.

B. Reduction to the Polyoxyethylene Diester

The product of Example 3A and 25 g of nickel on kieselguhr were charged to a stirred, heated pressure vessel. The mixture was heated to 160°–170° C. and pressurized with hydrogen to 400 psig. After 6–8 hours, samples were removed at intervals for determination of the iodine value. The reaction was continued until the iodine value was less than 0.5 g/100 g of sample.

EXAMPLE 4

Preparation of Phosphated Polyoxyethylene Diester (R is (HO)$_2$P(=O)(OCH$_2$CH$_2$)$_n$—OCH$_2$CH$_2$—)

Polyoxyethylated (15 moles of ethylene oxide) diacid, obtained as in Example 3B was heated to 50°–60° C., stirred and purged thoroughly with nitrogen to remove air. To about 1015 g (1 mole) of this material was added 24 g (0.17 mole) of phosphorus pentoxide. An exothermic reaction began immediately, with an exotherm to 85°–95° C. The reaction mixture was maintained at this temperature by cooling and an additional 24 g (0.17 mole) of phosphorus pentoxide was added. The reaction was continued for three hours after all of the phosphorus pentoxide was added. The reactor was cooled to 50° C. prior to removal of a sample. The acid value of the product was 32 mg KOH/g, indicating that the reaction was complete. The batch was bleached at 85°–95° C. with 5 g of hydrogen peroxide, cooled to 30° C. and filtered.

EXAMPLE 5

Aroylpolyoxyethylene Cycloaliphatic Diester

An aroylpolyoxyethylene cycloaliphatic diester was synthesized in a two-liter autoclave fitted with nitrogen purge, condenser and receiver for the removal of by-product water. Charge weights were:

| | |
|---|---|
| 510.0 g. | Diacid 1550 |
| 2.0 g. | flake caustic |
| 636.0 g. | ethylene oxide |

After purging the system with nitrogen, Diacid 1550 and caustic were heated to 130° C. Ethylene oxide was added over a four-hour period, during which the temperature was kept at 150°–165° C. The resulting ethoxylated product was cooled to 90° C. for removal of a sample. The (by hydroxyl value) was 139. To this intermediate was added:

| | |
|---|---|
| 3.5 g. | acetic acid (glacial) |
| 7.5 g. | methanesulfonic acid (70%) |
| 340.0 g. | benzoic acid |

After purging with nitrogen, the temperature of the mixture was raised to and held at 165°–170° C. until the acid value was less than 5 mg KOH per gram. The theoretical amount of water was removed during the reaction and collected in the receiver. The sample was cooled and filtered.

The filtered product was hydrogenated in a two-liter autoclave:

| | |
|---|---|
| 1000.0 g | ethoxylated product, above |
| 50.0 g | Raney nickel |
| QS | hydrogen |

The reduction was run at 100°–125° C. and 200–250 psig until hydrogen consumption ceased. The product was cooled and filtered.

EXAMPLE 6

Ethoxylated castor and hydrogenated castor oils were prepared as in Example 3. Ethylene oxide adds to the hydroxyl group of castor oil.

EXAMPLE 7

A waterless dyeing composition was prepared from bis(2-ethylhexyl)cycloaliphatic diester of Example 2 and tris(2-ethylhexyl)trimellitate (Eastman) in 20:80 weight ratio, containing 5 grams/liter of Disperse Blue 60 and 0.1% by weight of triphenyl phosphite.

This composition was kept at 185° C. and stirred while a piece of polyester carpet was immersed therein for 30 sec. The carpet section was removed, washed in perchloroethylene and dried. The carpet was homogeneously colored with good dye fixation. There was little or no smoking during the coloring operation.

EXAMPLE 8

Dip dye solution was made from 80 parts by weight of tris(2-ethylhexyl)trimellitate, 20 parts by weight of bis(2-ethylhexyl)cycloaliphatic diester and 0.1% by weight of triphenyl phosphite.

To this was added Sandoz Pigment Yellow 2B at a level of 5 g/l. The resulting composition was used to dye a piece of nylon carpet (200° C., 2 min). The experiment was otherwise as in Example 7. The nylon carpet was dyed yellow with good levelness.

EXAMPLE 9

Pure tris(2-ethylhexyl)trimellitate was used to dye nylon and polyester samples with Disperse Blue 56 (5 g/l) at 185° C. for 30 sec. Results were similar to those of Examples 7 and 8. Similarly good results were obtained, using 10 g or 20 g/l of the same dye.

EXAMPLE 10

Pure bis(2-ethylhexyl)diester of Example 2 was used to dye nylon and polyester samples with Disperse Blue 56 (5 g/l) at 185° C. for 30 sec. Results were similar to those of Examples 7 and 8.

EXAMPLE 11

Forty grams of dye solution containing Disperse Blue in 80:20 tris(2-ethylhexyl)trimellitate:bis(2-ethylhexyl)-cycloaliphatic diester at a level of 5 g of dye/liter was treated at 150° C. with 3 g of activated carbon. The hot solution was filtered through Whatman No. 1 filter paper. To the lightly-colored filtrate was added 1 g of activated carbon. The mixture was heated to 150° C. and filtered hot. The filtrate was light yellow in color and could be used for a dye bath with another color dye.

EXAMPLE 12

Experiments similar to those of Example 11 were done with an 80:20 dye bath, containing 5–10 g/l of one of Disperse Red 60, Disperse Yellow 54, Nylanthrene Blue 2RFF (an acid dye) or Roma Violet Pigment RL 9613. In each case, treatment with about 10% by weight of activated carbon, referred to colorant weight, at 100°–200° C. results in essentially clean dye bath solution, which can be recycled without distillation.

EXAMPLE 13

(a) Dye solution comprising ethylene glycol, containing 1 gram/liter of pure presscake blue dye, was heated to 180° C. with constant stirring. The solution began to smoke at about 107° C. Smoking became very troublesome at 125° C. and even worse at 180° C.

Into the solution at 180° C. was immersed a six-inch piece of polyester zipper. After one minutes' immersion, the zipper was removed, cooled in air and cleaned in perchloroethylene solution, to remove residual dye solution. The zipper was difficult to clean. The zipper was unevenly colored and had many splotches.

(b) A similar experiment was done, using diethylene glycol as solvent. The dyed product was unevenly dyed and had many splotches.

These experiments demonstrate that use of glycol solvents is unacceptable from a pollution standpoint and that unacceptable dyeings are obtained.

EXAMPLE 14

A 3/16 inch stainless steel tank of 70 gallon capacity containing 520 pounds of dip dye solution of glyceryl tribenzoate and nonylphenol 7 (oxyethylene units, Union Carbide Corp.) in 20:80 weight ratio, at a dye level of 0.5 pound of Latyl Blue BCN 356 (crude ground dye) was heated externally to provide a temperature of 182° C.

A pump was used to circulate material in the dye bath during heating and while a polyester zipper about two feet long was immersed in the stirred bath for about 30 seconds. The zipper was removed from the bath and lightly squeezed with a roller to remove excess dye solution. The zipper was washed in a tank containing a mixture of trichloroethylene and perchloroethylene. After 30 seconds' immersion in the bath, the zipper was dried in a hot air chamber. The zipper was ready for final inspection and shipment.

The zipper was rapidly dyed by this method and was pleasant in appearance.

EXAMPLE 15

Dip dye solution is made from the following ingredients, as above:

| parts by weight | |
|---|---|
| 40 | hydrogenated cycloaliphatic diester with 2-ethylhexyl alcohol (Example 2) |
| 40 | propylene glycol dibenzoate |
| 20 | POE nonylphenyl laurate (Example 1) |
| 1 | Latyl Blue BCN 356 |

The dip dye solution is used as above with similar results.

EXAMPLE 16

Textile-treating compositions are made by combining materials prepared as above in the following amounts by weight:

| parts by weight | | |
|---|---|---|
| A | B | |
| 20 | 0 | bis(2-ethylhexyl)ester |
| 40 | 60 | trioctyl trimellitate |
| 20 | 20 | polyethoxyethylene nonylphenol laurate (9.5 moles ethylene oxide) |
| 10 | 10 | polyethoxyethylene hydrogenated castor (25 moles ethylene oxide) |
| 10 | 10 | polyethoxyethylene castor (80 moles ethylene oxide) |

EXAMPLE 17

The textile-treating compositions of Example 16 are applied during the dyeing cycle to a 10 g swatch of T56 textured polyester fabric by the following technique:

A sample swatch is placed in a stainless steel beaker containing 150 ml of water, 0.067 g of disperse yellow 67, 0.091 g of disperse blue 56, 0.1 g of acetic acid (56%) and 0.03 g of textile-treating composition. The beaker is sealed and placed in a launderometer set at 38° C. The temperature is raised at 4°–5° C./min to 130° C. and held for 30 min. The beaker is cooled at 4°–5° C./min to 52° C. and removed from the launderometer. The polyester swatch is removed from the beaker. It is uniformly dyed in a medium brown shade. Nearly all of the dye is exhausted from the aqueous solution.

EXAMPLE 18

Textile-treating compositions are prepared as in Example 16 from:

| parts by weight | | |
|---|---|---|
| A | B | |
| 30.0 | 0 | cycloaliphatic bis(2-ethylhexyl)ester |
| 30.0 | 60.0 | trioctyl trimellitate |
| 15.0 | 15.0 | POE(9.5)nonylphenol laurate |
| 5.0 | 5.0 | POE(80)castor oil |
| 10.0 | 10.0 | POE(25)hydrogenated castor oil |
| 10.0 | 10.0 | POE(15)diester phosphate, K salt (Example 4) |

(b) The compositions thus obtained are applied from a 20% aqueous solution as a spin finish to 150 denier polyester fiber, which is then spun and textured.

Spin finish, applied as above, does not smoke, drip, build up on heater plates or cause other undesirable conditions.

The texturized yarn is knitted into a double knit fabric. The yarn knits well. No haze, mist or odor is observed in the knitting plant.

The fabric is taken to the dyehouse and loaded into a 6-port Gaston County jet machine. The goods are neither overflow washed nor scoured. Foaming during loading of the fabric is significantly lower than that of fabrics treated with conventional lubricants. A good dyeing is obtained.

EXAMPLE 19

(a) Spin finishing compositions are prepared from:

| parts by weight | | |
|---|---|---|
| A | B | |
| 30 | 0 | cycloaliphatic bis(2-ethylhexyl)ester |
| 30 | 60 | trioctyl trimellitate |
| 15 | 15 | POE(9)nonylphenol laurate |
| 5 | 5 | POE(81)castor oil |
| 10 | 10 | POE(25)hydrogenated castor oil |
| 10 | 10 | POE(10)nonylphenol phosphate, K salt |

(b) The compositions of part (a) are applied as a 20% emulsion, to polyester yarn (505 denier/34 filament) from a single merge so as to achieve 0.5–0.6% dry pickup. The resulting texturized yarn has good properties.

EXAMPLE 20

Lubricants of the following compositions are prepared:

| parts by weight | | |
|---|---|---|
| A | B | |
| 20.0 | 0 | cycloaliphatic bis(2-ethylhexyl)ester |
| 39.3 | 59.3 | trioctyl trimellitate |
| 20.0 | 20.0 | POE(9.5)nonylphenol laurate |
| 10.0 | 10.0 | POE(10)nonylphenol |
| 0.1 | 0.1 | butylated hydroxytoluene |
| 6.3 | 6.3 | POE(9.5)nonylphenol phosphate |
| 2.5 | 2.5 | triethanolamine (98%) |
| 1.8 | 1.8 | water |

EXAMPLE 21

Coning oil, for application at a level of 2–4% after texturizing, is prepared from:

| parts by weight | | |
|---|---|---|
| A | B | |
| 7.50 | 0 | cyclaliphatic bis(2-ethylhexyl)ester |
| 7.50 | 15.0 | trioctyl trimellitate |
| 3.75 | 3.75 | POE(9.5)nonylphenol coconate |
| 10.00 | 10.0 | POE(3.5)lauryl alcohol |
| 2.50 | 2.50 | POE(25)hydrogenated castor oil |
| 2.50 | 2.50 | POE(10)nonylphenol phosphate |
| 64.15 | 64.15 | Ucon LB-65 |
| 0.10 | 0.10 | butylated hydroxytoluene |
| 1.00 | 1.00 | triethanolamine |
| 1.00 | 1.00 | water |

The coning oil provides necessary lubrication to allow yarn to be rapidly coned, knitted or woven.

EXAMPLE 22

An apparatus for removal of dye solutions of the invention consisted of three stainless steel columns, each 5 cm in diameter and 50 cm long. Each column was fitted with a circular pad (5 microns), in the center of which was a hole 0.64 cm in diameter. The pad was covered with a disc of stainless steel screen and topped with Whatman no. 1 filter paper.

The first column of the series was packed with 100–200 g of activated granular carbon (Calgon Corp.) and was used as a holding tank for heating the dye solution to about 185° C.

Each of the second and third columns was packed with about 500 g of activated carbon. The temperature of the liquid being passed through these columns was about 185° C. and 120° C., respectively.

Dye solutions (Disperse Blue 60 at a concentration of 5 g/l) in 80:20 tris(2-ethylhexyl)trimellitate: bis(2L1-ethylhexyl)cycloaliphatic diester by volume were decolorized in the foregoing series of three columns. After 15.5 liters of dye solution was decolorized by about 500 g of activated granular carbon. At a dye concentration of 5 g/liter, 1 pound of carbon will accordingly decolorize about 30 pounds of dye mixture.

Flow rates were varied from very slow to a rate of 1 gal/min/square foot of surface area without adversely affecting recovery of the vehicles.

The foregoing apparatus was used for the decolorization of dye solutions, containing 5–10 g/l of about 60 different dyes. The process need not be carried out under an inert atmosphere.

EXAMPLE 23

Spin finish compositions were prepared from:

| A | B | C | |
|---|---|---|---|
| 10 | 5 | 10 | 80:20 mixture of tris-(2-ethylhexyl)trimellitate and bis-(2-ethylhexyl)cycloaliphatic diester |
| 5 | — | — | POE(10)nonylphenol phosphate |
| — | 5 | 5 | POE(5)hydrogenated castor oil |
| — | 5 | 5 | POE(3.5)lauryl alcohol phosphate |
| 5 | 5 | — | POE(25)hydrogenated castor oil |
| 80 | 80 | 80 | water |

The compositions were evaluated on polyamide yarns, which were measured for yarn-to-yarn (Y/Y) and yarn-to-metal friction, static and percent oil loss on drawing, measured against a standard commercial spin finish. The following results were obtained:

| Y/M (g) | Y/Y (g) | Static (mv) | Oil loss (%) | |
|---|---|---|---|---|
| 85 | 145–654 | +125 | 0.05 | Commercial spin finish |
| 135 | 488–660 | −20 | 0.08 | A |
| 130 | 452–631 | ±0 | 0.09 | B |
| 130 | 480–673 | +110 | 0 | C |

These results show that spin finish compositions, prepared in accordance with the invention, compare favorably to commercially available compositions.

EXAMPLE 24

Spin finish for polyamide was prepared from:

| parts | |
|---|---|
| 5 | tris(2-ethylhexyl)trimellitate |
| 5 | 1025 polypropylene glycol ditallate |
| 5 | POE(25)hydrogenated castor oil |
| 5 | POE(10)nonylphenol phosphate |
| 80 | water |

EXAMPLE 25

Heat stability of non-aqueous dye baths was determined by heating for 96 h at 185° C. A representative aromatic polyester, tris(2-ethylhexyl)trimellitate was light amber in color and contained no tarry residue. Under the same conditions an 80:20 mixture of tris(2-ethylhexyl)trimellitate and bis(2-ethylhexyl)cycloaliphatic diester was useless for further dyeing and contained a black, tarry residue.

EXAMPLE 26

Dye solution is made from:

| parts by weight | |
|---|---|
| 80 | trioctyl trimellitate |
| 20 | polyoxyethylene nonylphenol laurate (9.5 moles of ethylene oxide) |
| 1 | Latyl Blue BCN 356 |

The dip dye solution is used as in Example 15, with similar results.

EXAMPLE 27

Dye bath was made by dissolving 0.5% by weight of an acid dye, Nylanthrene Blue 2RFF, in 200 g of a bath consisting of 20 g of POE (5) nonylphenol, 144 g of tris(2-ethylhexyl) trimellitate, 18 g of triisooctyl trimellitate, 17.2 g of linear trimellitate, 0.4 g of triphenyl phosphite and 0.4 g of 2,2'-oxamido bis[ethyl 3-(3,5-di-tert.-butyl4-hydroxyphenyl)propionate].

The dye bath was heated to 150° and a swatch of nylon fabric was dyed by immersion in the heated bath for one minute. The dyed swatch was removed from the bath, washed with perchloroethylene and dried. The dyeing was dark blue and of good levelness.

A similar bath was prepared, using an organic pigment, Filamid Red 2925, instead of an acid dye. A carpet sample dyed well and had good levelness and fastness.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

I claim:

1. A waterless dip dye composition for apparel or other thermoplastic articles, comprising an aromatic polyester of the formula $C_6H_z(COOR_1)_{z'}$, wherein $R_1$ is substituted or unsubstituted alkyl of 6–22 carbon atoms or the residue of an alkylphenol ether of an alkoxyalkanol; z is 3, 4, 5, or 6 and z' is 6-z; and a cycloaliphatic diester of the formula

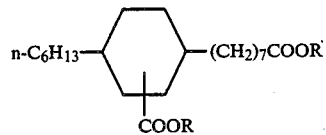

wherein R is substituted or unsubstituted straight or branched chain alkyl of 4–20 carbon atoms, polyoxyalkylene of the formula $R'(OC_xH_{2x})_n$ or phosphated polyoxyalkylene of the formula

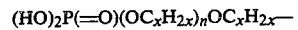

$$(HO)_2P(=O)(OC_xH_{2x})_nOC_xH_{2x}-$$

or a salt thereof, wherein $(C_xH_{2x}O)_n$ is $(C_2H_4O)_n-$, $(C_3H_6O)_n-$ or $(C_2H_4O)_p-(C_3H_6O)_q-$; R' is H or ArCO; Ar is substituted or unsubstituted mono- or bicyclic aryl of up to 15 carbon atoms; x is 2 or 3; n is 2–22 and the sum of p+q is n; and an organic colorant.

2. The composition of claim 1, containing at least 5% by weight of the aromatic polyester.

3. The composition of claim 1, containing at least 5% by weight of a trialkyl trimellitate, wherein alkyl is of 6–22 carbon atoms.

4. The composition of claim 1, containing at least 5% by weight of cycloaliphatic diester, wherein R is alkyl of 6–20 carbon atoms.

5. The composition of claim 1, which contains 0.05–2.0% by weight of triphenyl phosphite.

6. The composition of claim 1, wherein the organic colorant is a disperse dye.

7. The composition of claim 1, consisting essentially of 15–90% by weight of trialkyl trimellitate, wherein alkyl is of 6–22 carbon atoms; 0.1–2.0% by weight of triphenyl phosphite; organic colorant and cycloaliphatic diester, wherein R is alkyl of 6–22 carbon atoms.

8. The composition of claim 7, wherein the trialkyl trimellitate is tris(2-ethylhexyl)trimellitate and the cycloaliphatic diester is the bis(2-ethylhexyl)diester.

9. A process for coloring articles, made from plastic, comprising exposing an article being treated to a composition of claim 1, maintained at a temperature from 100° C. to the temperature at which the plastic degrades, for a time adequate to achieve the desired degree of coloration.

10. The process of claim 9, wherein the plastic is polyester, polyamide, polyurethane, acrylic, halogenated polyolefin or epoxy.

11. The process of claim 9, wherein the article is immersed in the coloring composition at a temperature of at least 140° C. for at least 1 minute.

12. The process of claim 9, wherein the article is sprayed with the coloring composition and heated in a bath or oven to at least 140° C.

13. The process of claim 9, including the further steps of cleaning the colored article with a halogenated solvent and drying the thus-cleaned article.

14. The process of claim 13, wherein the halogenated solvent is perchloroethylene or trichloroethylene and the halogenated solvent is collected and recycled to the process.

15. A process for coloring articles, made from polyester, polyamide, polyurethane, acrylic, halogenated polyolefin or epoxy plastic, comprising exposing an article being treated to a waterless coloring composition of claim 7, maintained at 120°–235° C., for a time adequate to achieve the desired degree of coloration.

16. The process of claim 15, wherein the article is immersed in the coloring composition at a temperature of at least 140° C. for at least 1 minute.

17. The process of claim 16, including the further steps of drying the colored article, cleaning the article with a halogenated solvent and drying the thus-cleaned article.

18. A process for coloring articles, made from polyester, polyamide, polyurethane, acrylic, halogenated polyolefin or epoxy plastic, comprising exposing an article being treated to a waterless coloring composition of claim 2, maintained at 120°–235° C. for a time adequate to achieve the desired degree of coloration, wherein the coloring composition is treated after use with activated carbon to recover the waterless medium for use with another organic colorant.

19. A process for coloring articles, made from polyester, polyamide, polyurethane, acrylic, halogenated polyolefin or epoxy plastic, comprising exposing an article being treated to a waterless coloring composition of claim 3, maintained at 120°–235° C. for a time adequate to achieve the desired degree of coloration, wherein the coloring composition is treated after use with activated carbon to recover the waterless medium for use with another organic colorant.

20. A waterless dip dye composition for apparel or other thermoplastic articles, comprising an aromatic polyester of the formula $C_6H_{z'}(COOR_1)_z$, wherein $R_1$ is substituted or unsubstituted alkyl of 6–22 carbon atoms or the residue of an alkylphenol ether of an alkoxyalkanol; z is 3, 4, 5 or 6; and z' is 6-z and an organic colorant.

21. A process for coloring articles, made from plastic, comprising exposing an article being treated to a composition of claim 20, maintained at a temperature from 100° C. to the temperature at which the plastic degrades, for a time adequate to achieve the desired degree of coloration.

22. A waterless dip dye composition for apparel or other thermoplastic articles, comprising a cycloaliphatic diester of the formula

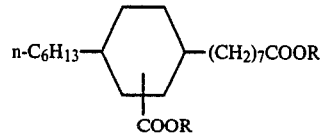

wherein R is substituted or unsubstituted straight or branched alkyl of 4–20 carbon atoms, polyoxyalkylene of the formula $R'(OC_xH_{2x})_n$— or phosphated polyoxyalkylene of the formula $(HO)_2P(\!=\!O)$-$(OC_xH_{2x})_nC_xH_{2x}$— or a salt thereof, wherein $(C_xH_{2x}O)_n$— is $(C_2H_4O)_n$—, $(C_3H_6O)_n$— or $(C_2H_4O)_p(C_3H_6O)_q$; R' is H or ArCO; Ar is substituted or unsubstituted mono- or bicyclic aryl of up to 15 carbon atoms; x is 2 or 3; n is 2–22 and the sum of p+q is n; and an organic colorant.

23. A process for coloring articles, made from plastic, comprising exposing an article being treated to a composition of claim 21, maintained at a temperature from 100° C. to the temperature at which the plastic degrades, for a time adequate to achieve the desired degree of coloration.

24. A waterless dip dye composition for apparel or other thermoplastic articles, comprising an aromatic polyester of the formula $C_6H_{z'}(COOR_1)_z$, wherein $R_1$ is substituted or unsubstituted alkyl of 6–22 carbon atoms or the residue of an alkylphenol ether or an alkoxyalkanol; z is 3, 4, 5 or 6; and z' is 6-z; an organic colorant and at least 5% by weight of an additional optional dyeing assistant agent.

25. A process for coloring articles, made from plastic, comprising exposing an article being treated to a composition of claim 24, maintained at a temperature from 100° C. to the temperature at which the plastic degrades, for a time adequate to achieve the desired degree of coloration.

26. A textile-treating composition comprising at least 5% by weight of an aromatic polyester of the formula $C_6H_{z'}(COOR_1)_z$, wherein $R_1$ is substituted or unsubstituted alkyl of 6–22 carbon atoms or the residue of an alkylphenol ether of an alkoxyalkanol; z is 3, 4, 5, or 6 and z' is 6-z; and at least 0.5% by weight of an emulsifier or optional dyeing assistant agent.

27. The composition of claim 26, wherein the emulsifier or optional dyeing assistant agent is selected from the group consisting of alkoxylated alkylphenols and their esters, alkoxylated castor oil compounds, alkoxylated hydrgenated castor oil compounds, alkoxylated primary alkanols, salts of phosphated alkoxylated primary alkanols or phenols or a mixture thereof.

28. The composition of claim 26, further containing at least 0.5% by weight of a cycloaliphatic diester of the formula

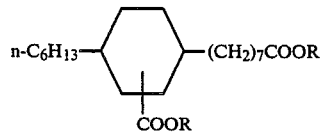

wherein R is substituted or unsubstituted straight or branched chain alkyl of 4-20 carbon atoms, polyoxyalkylene of the formula R'($OC_xH_{2x})_n$— or phosphated polyoxy alkylene of the formula $$(HO)_2P(=O)(OC_xH_{2x})_nOC_xH_{2x}-$$

or a salt thereof, wherein $(C_xH_{2x}O)_n$— is $(C_2H_4O)_n$—, $(C_3H_6O)_n$— or $(C_2H_4O)_p$— $(C_3H_6O)_q$—; R' is H or ArCO; Ar is substituted or unsubstituted mono- or bicyclic aryl of up to 15 carbon atoms; x is 2 or 3; n is 2-22 and the sum of p+q is n.

29. The composition of claim 27, containing at least 5% by weight of one or more emulsifiers or optional dyeing assistant agents.

30. A textile-treating composition of claim 28, comprising a spin finish composition containing 0-40% by weight of cycloaliphatic diester, 20-60% by weight of aromatic polyester and further containing 10-50% by weight of one or more emulsifiers or optional dyeing assistant agents.

31. The composition of claim 30, comprising 25-35 by weight of cycloaliphatic diester and 25-35% by weight of aromatic polyester.

32. A textile-treating composition of claim 28, comprising a lubricant containing 0-30% by weight of cycloaliphatic diester, 30-90% by weight of aromatic polyester and further containing 10-60% by weight of one or more optional dyeing assistant agents or emulsifiers.

33. The composition of claim 32, comprising 15-30% by weight of cycloaliphatic diester and 35-45% by weight of aromatic polyester.

34. A textile-treating composition of claim 28, comprising a coning oil containing 0-10% by weight of cycloaliphatic diester 5-20% by weight of aromatic polyester, and further containing 2-20% by weight of one or more emulsifiers or optional dying assistant agents and 60-70% by weight of ethylene oxide-propylene oxide copolymer.

35. A textile-treating composition of claim 28, comprising a dyeing assistant agent for aqueous dye baths, containing 0-40% by weight of cycloaliphatic diester, 20-90% by weight of aromatic polyester and further containing 10-35% by weight of one or more optional dyeing assistant agents.

36. The composition of claim 35, comprising 25-35% by weight of cycloaliphatic diester and 35-45% by weight of aromatic polyester.

37. The composition of claim 35, comprising 40-60% by weight of aromatic polyesters, plus optional emulsifiers or dyeing assistant agents.

38. A composition of claim 24, further containing triphenyl phosphite or 2,2'-oxamidobis[ethyl 3-(3,5-di-tert.-butyl-4-hydroxyphenyl)propionate].

39. The composition of claim 24, further containing triphenyl phosphite or 2,2'-oxamidobis[ethyl 3-(3,5-di-tert.-butyl-4-hydroxyphenyl)propionate].

40. The composition of claim 24, wherein the optional dyeing assistant agent is an alkoxylated alkylphenol.

41. The composition of claim 24, wherein the optional dyeing assistant agent is an alkoxylated alkylphenol and the composition further contains triphenyl phosphite or 2,2'-oxamidobis[ethyl 3-(3,5-di-tert.-butyl-4-hydroxyphenyl)propionate].

42. The composition of claim 24, wherein the optional dyeing assistant agent is an alkoxylated alkylphenol and the composition further contains triphenyl phosphite and 2,2'-oxamidobis[ethyl 3-(3,5-di-tert.-butyl-4-hydroxyphenyl)propionate].

* * * * *